(12) United States Patent
Kaveri et al.

(10) Patent No.: US 10,901,784 B2
(45) Date of Patent: Jan. 26, 2021

(54) APPARATUS AND METHOD FOR DEFERRAL SCHEDULING OF TASKS FOR OPERATING SYSTEM ON MULTI-CORE PROCESSOR

(71) Applicant: SAMSUNG ELECTRONICS CO., LTD., Suwon-si (KR)

(72) Inventors: Anup Manohar Kaveri, Bangalore (IN); Vinayak Hanagandi, Bangalore (IN); Nischal Jain, Bangalore (IN); Rohit Kumar Saraf, Bangalore (IN); Shwetang Singh, Bangalore (IN); Samarth Varshney, Bangalore (IN); Srinivasa Rao Kola, Bangalore (IN); Younjo Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 16/387,723

(22) Filed: Apr. 18, 2019

(65) Prior Publication Data
US 2019/0324801 A1    Oct. 24, 2019

(30) Foreign Application Priority Data

Apr. 19, 2018  (IN) .............................. 201841014884
Mar. 20, 2019  (IN) .............................. 201841014884

(51) Int. Cl.
*G06F 9/46*  (2006.01)
*G06F 9/48*  (2006.01)

(52) U.S. Cl.
CPC ............ *G06F 9/4881* (2013.01); *G06F 9/461* (2013.01); *G06F 9/485* (2013.01); *G06F 9/4812* (2013.01)

(58) Field of Classification Search
None
See application file for complete search history.

(56) References Cited

U.S. PATENT DOCUMENTS

| | | | |
|---|---|---|---|
| 2006/0200610 | A1 | 9/2006 | Yasue et al. |
| 2006/0253853 | A1 | 11/2006 | Jiang |
| 2007/0204268 | A1 | 8/2007 | Drepper |
| 2008/0148291 | A1 | 6/2008 | Huang et al. |

(Continued)

FOREIGN PATENT DOCUMENTS

KR    10-1534139 B1    7/2015

OTHER PUBLICATIONS

Deepak Kumar Gauba, "Hardware Implementation of Real-Time Operating System's Thread Context Switch", In Computer Engineering Boise State University, Aug. 2010, pp. 1-93. (105 pages total).

(Continued)

*Primary Examiner* — Gregory A Kessler
(74) *Attorney, Agent, or Firm* — Sughrue Mion, PLLC

(57) ABSTRACT

Provided is a method for scheduling of tasks for an operating system on a multi-core processor. The method includes receiving a system call for initiating a scheduling operation on a second core and invoking a scheduling instance to the second core, and the scheduling instance notifies the scheduling operation of an incoming high priority task. Further, the method includes deferring a switching context instance at the second core, and the deferring the switching context instance at the second core includes unblocking the first core to perform other tasks.

20 Claims, 18 Drawing Sheets

(56) References Cited

U.S. PATENT DOCUMENTS

2014/0075450 A1   3/2014   Bates

OTHER PUBLICATIONS

International Search Report (PCT/ISA/210) dated Jul. 23, 2019 by the International Searching Authority in counterpart International Patent Application No. PCT/KR2019/004502.
Written Opinion (PCT/ISA/237) dated Jul. 23, 2019 by the International Searching Authority in counterpart International Patent Application No. PCT/KR2019/004502.

APPARATUS AND METHOD FOR DEFERRAL SCHEDULING OF TASKS FOR OPERATING SYSTEM ON MULTI-CORE PROCESSOR

CROSS REFERENCE TO RELATED APPLICATION

This application is based on and claims priority under 35 U.S.C. § 119 to an Indian Patent Provisional Application No. 201841014884 filed on Apr. 19, 2018 and an Indian Patent Complete Application No. 201841014884 filed on Mar. 20, 2019, the disclosures of which are incorporated by reference in their entireties.

BACKGROUND

The disclosure relates to a real-time operating system, and, more particularly, relates to a system and method for scheduling of tasks for an operating system on a multi-core processor.

In general, use of a multi-core system for scheduling multiple tasks at a time on multiple cores of the multi-core system to increase system performance is well known. The multi-core system is commonly used in applications such as wireless network applications (5G), cognitive systems, IoT applications, biomedical systems, automobiles, etc. The multi-core system is processed in two main ways which include a Symmetric multiprocessing (SMP) system and Asymmetric multi-processing (AMP) system. The AMP system includes a single instance of a real-time operating system (RTOS) confined to a single core resulting in the scheduling schemes confided only to the core where the RTOS is running. The SMP system is processing of tasks using a multi-core system that shares a common operating system and a common memory, which results in extending of scheduling schemes across all the cores participating in the multi-core system. A single copy of the operating system is available to all the processors which share equal access to the common memory via a communication path.

Since the SMP system has only a single copy of the operating system for all the cores, two or more tasks may attempt to access a critical data section of the operating system at the same time which may cause unexpected or erroneous data. Further, locks are used to limit access to the critical data section to one core/task at a time. In order to access the critical data section of the operating system, the task must obtain a lock and on completion of execution, the core/task must release the lock to make the lock available to other tasks. However, in case two or more tasks require access to the operating system at the same time, only one of the tasks will be given access and the other tasks must remain idle. Therefore, a delay is created in the overall system operation when a task invokes a system call.

Conventional mechanisms also include a multiple lock strategy to access different critical data sections of the operating system. However, a given task may have to acquire a number of locks to access the different critical data sections of the operating system, requiring the task to wait for all of the necessary locks to be made available. In the process, the task which is blocked, awaiting some of the locks to free up, will block any other task waiting for the locks from accessing the critical data section. This situation results in a deadlock where the computer system freezes because two tasks are holding and waiting for each other's locks. Therefore, the single lock mechanism may result in unacceptably long delays to the SMP system and the multiple lock mechanism suffers from performance problems and deadlocking.

The above information is presented as background information only to help the reader to understand the present disclosure. Applicants have made no determination and make no assertion as to whether any of the above might be applicable as prior art with regard to the present disclosure.

An aspect of the disclosure is to provide a system and method for deferral scheduling of tasks for an operating system on a multi-core processor.

Another aspect of the disclosure is to provide a fragmented scheduling instance which can be executed on a plurality of cores of the multi-core processor independently without stalling operation of any of the cores.

Another aspect of the disclosure is to defer a switching context instance at a second core.

Another aspect of the disclosure is to execute a deferred scheduler instance by determining an imbalance in at least one core when a Software Generated Interrupt (SGI) is received by the second core.

Another aspect of the disclosure is to provide a scheduling operation including at least one of preempting a currently running task, suspending the currently running task and balancing the currently running task.

SUMMARY

According to an embodiment, a method for scheduling of tasks for an operating system on a multi-core processor includes receiving a system call for initiating a scheduling operation on a second core and invoking a scheduling instance to the second core, where the scheduling instance notifies the scheduling operation of an incoming high priority task. Further, the method includes deferring a switching context instance at the second core, where the deferring the switching context instance at the second core unblocks the first core to perform other tasks.

The method may further include executing at least one other system call on at least one core, and executing the deferred switching context instance by determining an imbalance in at least one core when a Software Generated Interrupt (SGI) is received by the second core.

The scheduling instance may be invoked by sending a Software Generated Interrupt (SGI), the scheduling operation may include executing the incoming high priority task on the second core, and the scheduling instance may include at least one of: preempting a currently running task in which the currently running task is running on the second core, suspending the currently running task, and balancing the currently running task.

The preempting the task may include determining a preemption condition by tracking priorities of the task currently running on the second core and a plurality of tasks which are in a ready state, determining whether the preemption of the task currently running on the second core needs to be carried out successively in the scheduling instance or to be deferred, and performing one of: saving a context of a task to be preempted and restoring a context of a task to be executed when the preemption needs to be carried out successively in the scheduling instance, where the task to be preempted is the task currently running on the second core and the task to be executed is a task having a higher priority than the task currently running on the second core, and performing a system state handling and signaling when the preemption is to be deferred.

The suspending the currently running task may include determining that the task currently running is to be suspended, saving a context of the task currently running and suspending the task currently running, determining a next highest priority task to be scheduled into a running state, and performing one of: scheduling the next highest priority task successively in a suspension instance, and deferring the next highest priority task to a later point, where states of the system are modified by the suspension instance.

The balancing the currently running task may include determining a deferred operation to be resumed in the invoked instance, and performing the deferred operation in the invoked instance.

Signaling between the first core and the second core for notifying events may be carried out by activating interrupts invoked by software, and the method may further include receiving, by the second core, a Software Generated Interrupt (SGI) and determining the incoming task to be a high priority task during a first sub-critical section.

The method may further include storing a context of the current running task on the second core and restoring the context of the determined high priority task during a second sub-critical section.

Each of tasks may have an associated priority and each of the tasks may assume one state from among: Ready, Running and Suspended states.

The scheduling of the tasks may be based on priority, and the scheduling instance may include preemption instance responsible for running a number of tasks equal to the number of cores participating in symmetric multi-processing (SMP), the tasks being chosen from among the tasks having Ready state based on highest priority.

According to an embodiment, an apparatus for scheduling of tasks for an operating system on a multi-core system includes a memory, a multi-core processor including a plurality of cores, and an operating system (OS) to execute on the multi-core processor, where the OS includes a modular scheduler, and the modular scheduler is coupled to the multi-core processor and the memory and is configured to: receive a system call for initiating a scheduling operation on a second core, invoke a scheduling instance to the second core, the scheduling instance notifying the scheduling operation of an incoming high priority task, defer a switching context instance at the second core, and the deferring the switching context instance at the second core includes unblocking the first core to perform other tasks.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This disclosure is illustrated in the accompanying drawings, throughout which like reference letters indicate corresponding parts in the various figures. The embodiments herein will be better understood from the following description with reference to the drawings, in which.

DETAILED DESCRIPTION

Figure 1:
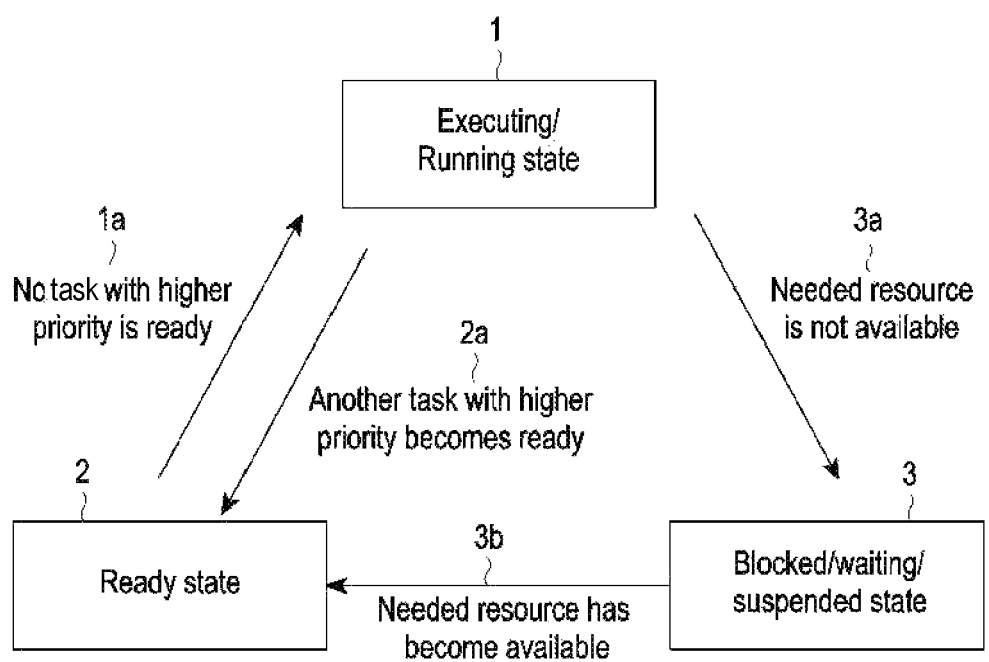
FIG. 1 is a state diagram illustrating various states of tasks which are scheduled on a plurality of cores of a multi-core system according to related art.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive as some embodiments can be combined with one or more other embodiments to form new embodiments.

Herein, the term "or" as used herein refers to a non-exclusive or unless otherwise indicated. Thus, the expression "a, b or c" indicates only a, only b, only c, both a and b, both a and c, both b and c, all of a, b, and c, or variations thereof. The examples used herein are intended merely to facilitate understanding of ways in which the embodiments herein can be practiced and to further enable those skilled in the art to practice the embodiments herein. Accordingly, the examples should not be construed as limiting the scope of the embodiments herein.

The embodiments may be described and illustrated in terms of blocks which carry out a described function or functions. These blocks, which may be referred to herein as units, engines, manager, modules or the like, may be physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Referring now to the drawings, and, more particularly, to FIGS. 1 through 7B where similar reference characters denote corresponding features consistently throughout the figures, there are shown embodiments.

FIG. 1 is a state diagram illustrating various states of tasks which are scheduled on a plurality of cores of a multi-core system according to related art.

Referring to FIG. 1, a plurality of tasks may be scheduled on the plurality of cores of the multi-core system. A scheduler which is provided within an operating system is used to schedule the plurality of tasks on the plurality of cores of the multi-core system. The plurality of tasks can be in one of the states such as a running state, a blocked state and a ready-to-run state.

At step 1, a task is executing on a core of the plurality of cores of the multi-core system. The task which is executing on the core at any instant of time has the highest priority as compared to all the other tasks which are queued up on the same core at that instant of time. Also, when there is no task with higher priority which is ready, then the task executing on the core continues the execution until a new task with higher priority than the currently executing task arrives (1a).

At step 2, the core includes tasks which are in the ready-to-run state. The tasks in the ready-to-run state are tasks which have a priority lower than the task which is executing on the core. Further, the task executing on the core may be moved into the ready-to-run state when a new task having a higher priority than the task executing on the core is added into the queue (2a).

At step 3, the core also includes tasks which are in the blocked/waiting/suspended state. The tasks which are in the blocked/waiting/suspended state are tasks which need some resources which are not available at a particular instant of time and are waiting for the resource to become available. When the task executing on the core needs some resources which are not available, the task executing voluntarily moves into the blocked/waiting/suspended state (3a). When the resource required by the task in the blocked/waiting/suspended state becomes available, the task is moved into the ready-to-run state.

Figure 2:
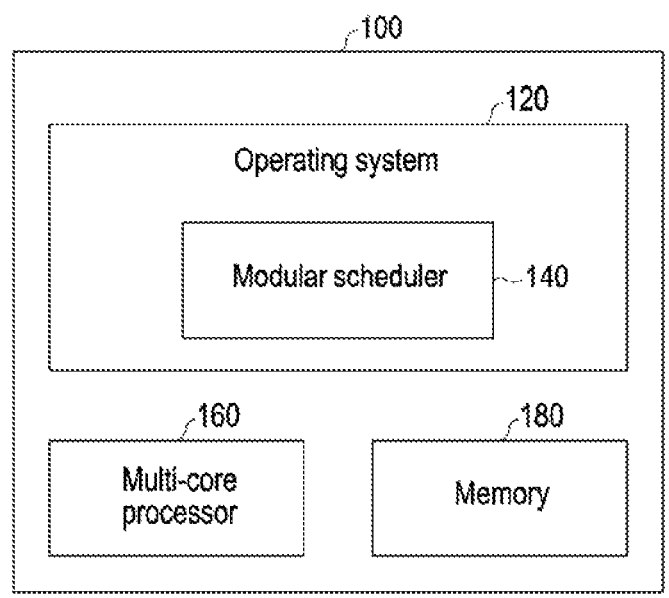
FIG. 2 is a block diagram of an apparatus for scheduling of tasks of an operating system on the multi-core system according to an embodiment as disclosed herein.

FIG. 2 is a block diagram of an apparatus 100 for scheduling of tasks of an operating system 120 on a multi-core system according to an embodiment as disclosed herein.

Referring to FIG. 2, for instance, the apparatus 100 may include the operating system 120, a multi-core processor 160 and a memory 180. The operating system 120 supports the SMP processing on the multi-core system and allows inter-task communication, signaling and scheduling services. Further, the operating system 120 includes a modular scheduler 140. In an embodiment, the apparatus 100 can be, for example, a mobile phone, a smart phone, Personal Digital Assistants (PDAs), a tablet, a wearable device, an Internet of things (IoT) device, etc.

In an embodiment, the modular scheduler 140 may be configured to schedule the tasks based on various scheduling schemes such as a priority based preemptive scheduling, a time slice based scheduling and the like. Due to scheduling of the tasks by the modular scheduler 140, the tasks transit between multiple states such as READY, SUSPENDED and RUNNING, etc. The modular scheduler 140 executing on a first core may be configured to generate a system call for initiating a scheduling operation on a second core and invoke a scheduling instance to the second core. The scheduling instance notifies the scheduling operation of an incoming high priority task and is invoked by sending the SGI to the second core. The scheduling operation includes executing the incoming high priority task on the second core. The scheduling instance can be at least one of preemption of a currently running task on the second core, suspension of the currently running task on the second core and balancing the currently running task on the second core.

The preemption instance is responsible for ensuring that the eligible tasks are executing on the respective cores of the multi-core system at any given point of time. According to a priority based preemption scheduling policy, the preemption instance ensures that the highest priority READY task is executed. When the preemption instance of the modular scheduler 140 is invoked, the modular scheduler 140 determines preemption condition by monitoring a priority of the task currently running on the second core and a plurality of tasks which are in the ready state on the second core. The modular scheduler 140 also determines whether the preemption of the task currently running on the second core needs to be carried out successively in the scheduling instance or to be deferred and performs one of saving a context of the task to be preempted and restoring a context of a task to be executed when the preemption needs to be carried out successively in the scheduling instance, and performing the system state handling and signaling when the preemption is to be deferred. The task to be preempted is the task currently running on the second core and a task to be executed is the task having a higher priority than the task currently running on the second core.

The suspension instance is responsible for managing the suspension of the task which is in the running state, i.e., when a task transits from running state to blocked state. When the suspension instance of the modular scheduler 140 is invoked, the modular scheduler 140 determines that the task currently running on the second core needs to be suspended and saves a context of the task currently running on the second core and suspends the task currently running on the second core. Further, the modular scheduler 140 may be configured to determine a next highest priority task to be scheduled into running state. Further, the modular scheduler 140 may be configured to perform one of scheduling the next highest priority task successively in the suspension instance and deferring the next highest priority task to a later point. The system states are modified when the suspension instance is invoked on the cores.

When the balancing instance of the modular scheduler 140 is invoked, the modular scheduler 140 determines a deferred operation to be resumed in the invoked instance and performs the deferred operation in the invoked instance. The balancing instance verifies whether the current running task along with the states modified by the other scheduler instance provides an indication for the deferred operation to be carried out. Further, the balancing instance also detects whether the eligibility of any running task on the other cores needs to be altered and provides a signal to the respective cores in such event providing discontinuous propagation of scheduler instances of the modular scheduler 140. In general, the balancing instance is invoked on receiving the software generated trigger by other scheduler instances.

Further, the modular scheduler 140 may be configured to defer a switching context instance at the second core to unblock the first core to perform other tasks. Further, the modular scheduler 140 may be configured to execute at least one other system call on at least one core and execute the deferred scheduler instance by determining an imbalance in at least one core when the Software Generated Interrupt (SGI) is received by the second core.

In an embodiment, the multi-core processor 160 may include a plurality of cores with interconnections between individual cores. The plurality of cores may be referred to collectively, or in general, as cores. The multi-core processor 160 can be configured to read from and/or write to the memory 180. Such read and write operations may relate to both instructions and data associated with the operations of the plurality of cores of the multi-core processor 160. Further, each of the cores within the multi-core processor 160 may be configured to individually access the memory 180. The signaling between the plurality of cores is achieved by generating software driven hardware interrupts to the plurality of cores.

In an embodiment, the memory 180 may be configured to store the instructions and the data associated with operations on the cores of the multi-core processor 160. The memory 180 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 180 may, in some examples, be considered a non-transitory storage medium. The term "non-transitory" may indicate that the storage medium is not embodied in a carrier wave or a propagated signal. However, the term "non-transitory" should not be interpreted that the memory 180 is non-movable. In some examples, the memory 180 may be configured to store larger amounts of information than the memory. In certain examples, a non-transitory storage medium may store data that can change over time (e.g., in Random Access Memory (RAM) or cache).

Although FIG. 2 shows the hardware elements of the apparatus 100, it is to be understood that other embodiments are not limited thereon. In other embodiments, the apparatus 100 may include less or more number of elements. Further, the labels or names of the elements are used only for illustrative purpose and do not limit the scope of the disclosure. One or more components can be combined together to perform same or substantially similar function of scheduling of tasks for the operating system on the multi-core processor.

Figure 3A:
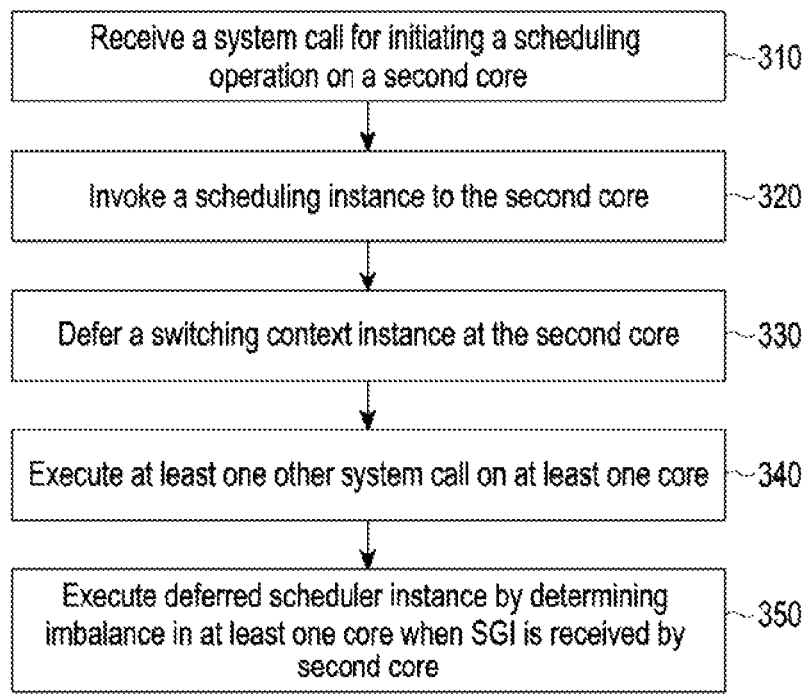
FIG. 3A is a flow chart illustrating a method for scheduling of tasks of the operating system on the multi-core system according to an embodiment as disclosed herein.

FIG. 3A is a flow chart 300a illustrating a method for scheduling of the tasks of the operating system on the multi-core system according to an embodiment as disclosed herein.

Referring to the FIG. 3A, at step 310, the apparatus 100 receives a system call for initiating the scheduling operation on the second core. For example, in the apparatus 100 as illustrated in FIG. 2, the modular scheduler 140 may be configured to receive the system call for initiating the scheduling operation on the second core.

At step 320, the apparatus 100 invokes the scheduling instance to the second core. For example, in the apparatus 100 as illustrated in FIG. 2, the modular scheduler 140 may be configured to invoke the scheduling instance to the second core.

At step 330, the apparatus 100 defers the switching context instance at the second core. For example, in the apparatus 100 as illustrated in FIG. 2, the modular scheduler 140 may be configured to defer the switching context instance at the second core.

At step 340, the apparatus 100 executes at least one other system call on at least one core. For example, in the apparatus 100 as illustrated in FIG. 2, the modular scheduler 140 may be configured to execute the at least one other system call on at least one core.

At step 350, the apparatus 100 executes the deferred scheduler instance by determining the imbalance in at least one core when the SGI is received by the second core. For example, in the apparatus 100 as illustrated in FIG. 2, the modular scheduler 140 may be configured to execute the deferred scheduler instance by determining the imbalance in at least one core when the SGI is received by the second core.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 3B:
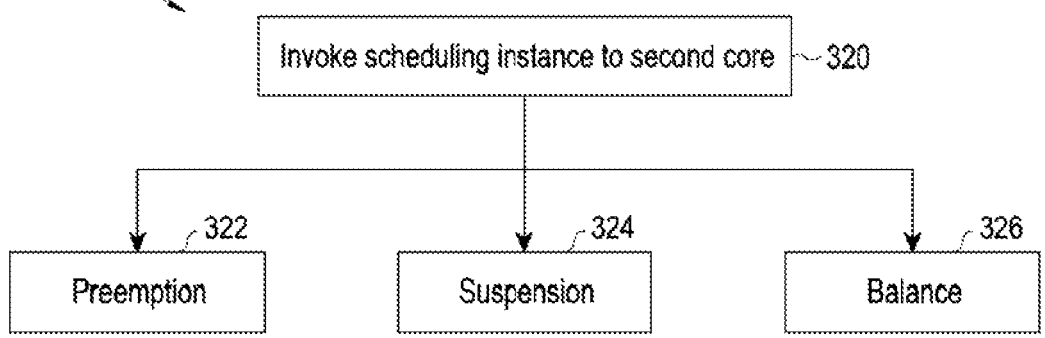
FIG. 3B is a flow chart illustrating a method for invoking a scheduling instance on the multi-core system according to an embodiment as disclosed herein.

FIG. 3B is a flow chart 300b illustrating a method for invoking a scheduling instance on the multi-core system according to an embodiment as disclosed herein.

Referring to FIG. 3B, at step 320, the apparatus 100 invokes the scheduling instance to the second core. For example, in the apparatus 100 as illustrated in FIG. 2, the modular scheduler 140 may be configured to invoke the scheduling instance to the second core.

The scheduling instance to the second core can be invoked in at least one of three ways, i.e., at step 322, the apparatus 100 can invoke a preemption scheduling instance, at step 324, the apparatus 100 can invoke a suspension instance and at step 326, the apparatus 100 can invoke a balancing instance.

Figure 3C:
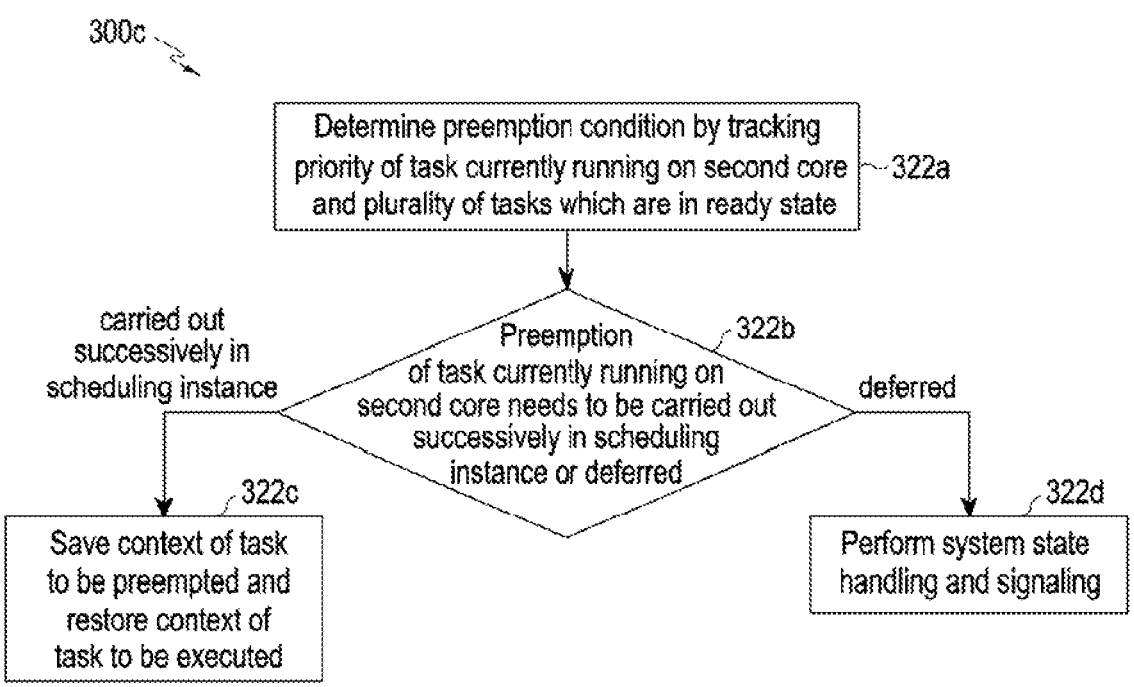
FIG. 3C is a flow chart illustrating a method for invoking a preemption scheduling instance on the multi-core system according to an embodiment as disclosed herein.

FIG. 3C is a flow chart 300c illustrating a method for invoking the preemption scheduling instance on the multi-core system according to an embodiment as disclosed herein.

Referring to FIG. 3C, at step 322a, the apparatus 100 determines the preemption condition by tracking the priority of the task currently running on the second core and the plurality of tasks which are in the ready state. For example, in the apparatus 100 as illustrated in FIG. 2, the modular scheduler 140 may be configured to determine the preemption condition by tracking the priority of the task currently running on the second core and the plurality of tasks which are in the ready state.

At step 322b, the apparatus 100 determines whether the preemption of the task currently running on the second core needs to be carried out successively in the scheduling instance or the preemption of the task currently running on the second core needs to be deferred. For example, in the apparatus 100 as illustrated in FIG. 2, the modular scheduler 140 may be configured to determine whether the preemption of the task currently running on the second core needs to be carried out successively in the scheduling instance or the preemption of the task currently running on the second core needs to be deferred.

In response to determining that the preemption of the task currently running on the second core needs to be carried out successively in the scheduling instance, at step 322c, the apparatus 100 saves the context of the task to be preempted and restores a context of a task to be executed. For example, in the apparatus 100 as illustrated in FIG. 2, the modular scheduler 140 may be configured to save the context of the task to be preempted and restore the context of the task to be executed in response to determining that the preemption of the task currently running on the second core needs to be carried out successively in the scheduling instance.

In response to determining that the preemption of the task currently running on the second core needs to be deferred, at step 322d, the apparatus 100 performs the system state handling and signaling. For example, in the apparatus 100 as illustrated in FIG. 2, the modular scheduler 140 may be configured to perform the system state handling and signaling in response to determining that the preemption of the task currently running on the second core needs to be deferred.

Figure 3D:
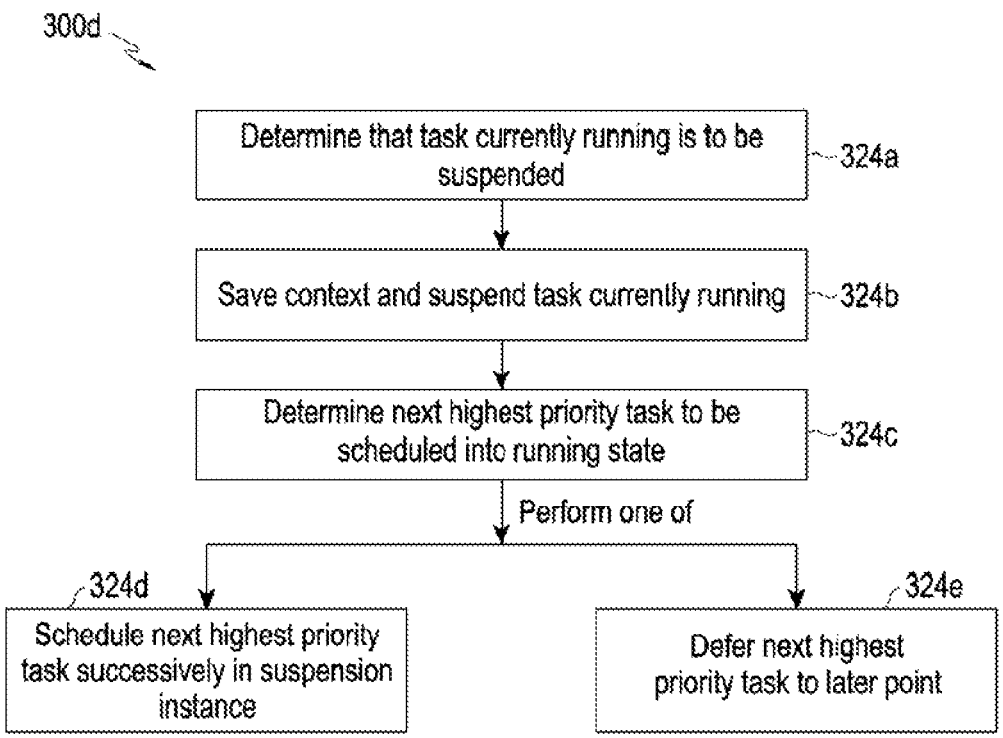
FIG. 3D is a flow chart illustrating a method for invoking a suspension scheduling instance on the multi-core system according to an embodiment as disclosed herein.

FIG. 3D is a flow chart 300d illustrating a method for invoking a suspension scheduling instance on the multi-core system according to an embodiment as disclosed herein.

Referring to FIG. 3D, at step 324a, the apparatus 100 determines that the task currently running is to be suspended. For example, in the apparatus 100 as illustrated in FIG. 2, the modular scheduler 140 may be configured to determine that the task currently running is to be suspended.

At step 324b, the apparatus 100 saves a context of the task currently running and suspends the task currently running. For example, in the apparatus 100 as illustrated in FIG. 2, the modular scheduler 140 may be configured to save the context and suspend the task currently running.

At step 324c, the apparatus 100 determines the next highest priority task to be scheduled into the running state. For example, in the apparatus 100 as illustrated in FIG. 2, the modular scheduler 140 may be configured to determine the next highest priority task to be scheduled into the running state.

At step 324d, the apparatus 100 schedules the next highest priority task successively in the suspension instance. For example, in the apparatus 100 as illustrated in FIG. 2, the modular scheduler 140 may be configured to schedule the next highest priority task successively in the suspension instance.

At step 324e, the apparatus 100 defers the next highest priority task to a later point. For example, in the apparatus 100 as illustrated in FIG. 2, the modular scheduler 140 may be configured to defer the next highest priority task to a later point.

Figure 3E:
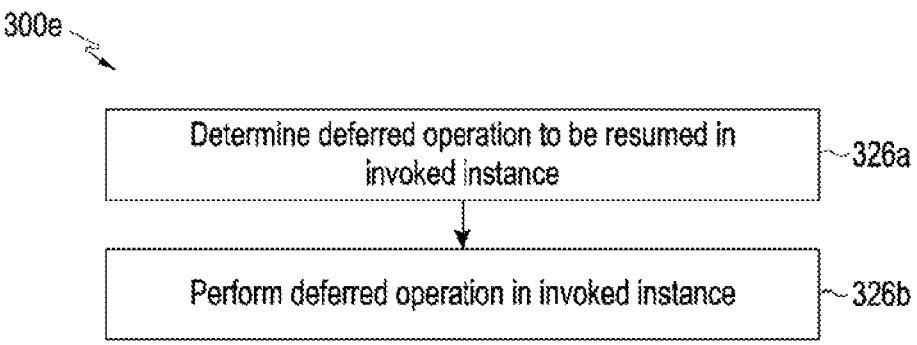
FIG. 3E is a flow chart illustrating a method for invoking a balancing scheduling instance on the multi-core system according to an embodiment as disclosed herein.

FIG. 3E is a flow chart 300e illustrating a method for invoking a balancing scheduling instance on the multi-core system according to an embodiment as disclosed herein.

Referring to FIG. 3E, at step 326a, the apparatus 100 determines the deferred operation to be resumed in the invoked instance. For example, in the apparatus 100 as illustrated in FIG. 2, the modular scheduler 140 may be configured to determine the deferred operation to be resumed in the invoked instance.

At step 326b, the apparatus 100 performs the deferred operation in the invoked instance. For example, in the apparatus 100 as illustrated in FIG. 2, the modular scheduler 140 may be configured to perform the deferred operation in the invoked instance.

Figure 4A:
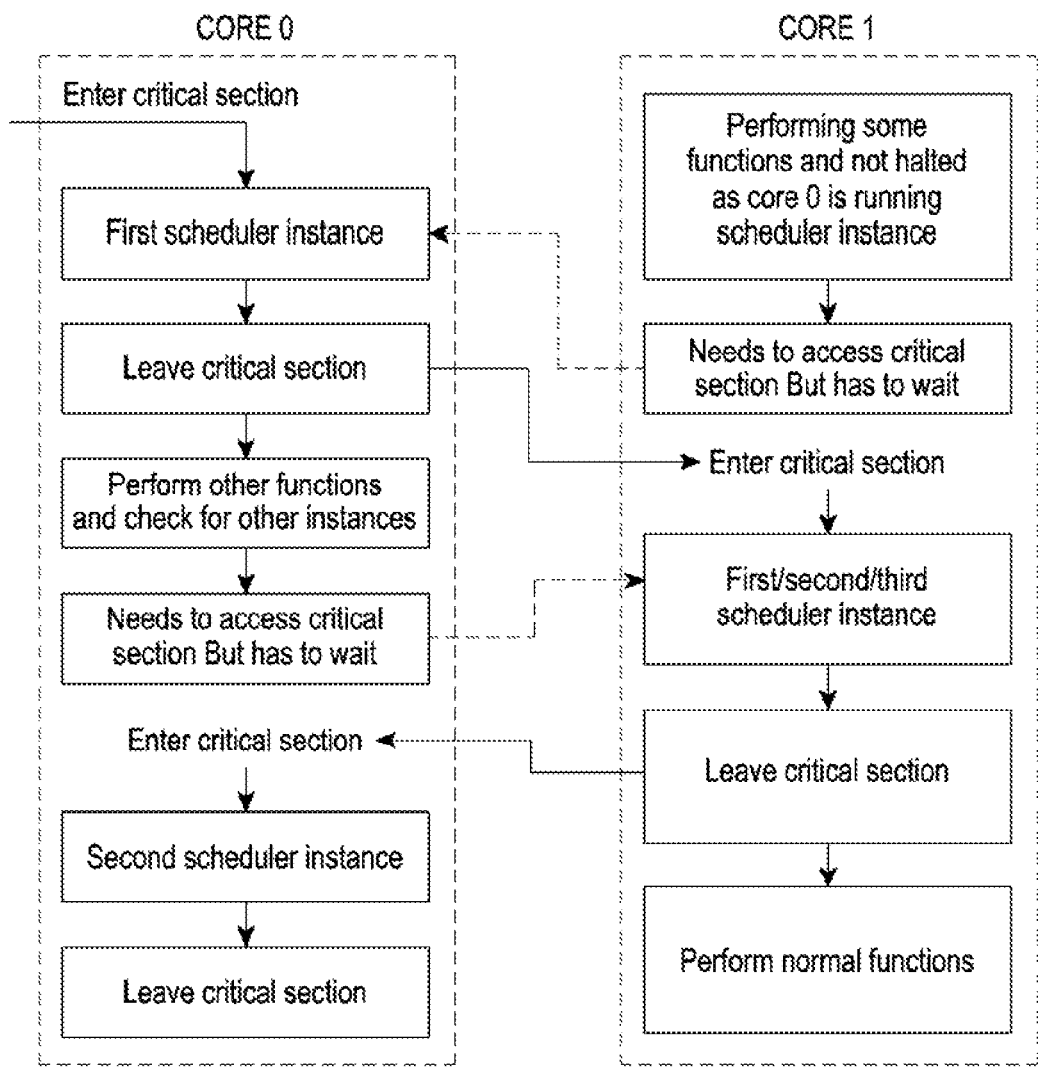
FIG. 4A is an example illustrating time parallel execution of the scheduling instance on two cores of the multi-core system according to an embodiment as disclosed herein.

FIG. 4A is an example illustrating time parallel execution of the scheduling instance on two cores of the multi-core system according to an embodiment as disclosed herein.

For instance, a multi-core system may include two cores, i.e., a core 0 and a core 1. A task which is running on the core 0 invokes a system call. The system call invoked by the task is bound to impact the core 1.

In the conventional methods and systems, when the system call is triggered by the task on the core 0, both the cores, i.e., the core 0 and the core 1 are taken into the control of the OS 120. The OS 120 then executes the monolithic code and performs the required modifications such as the state changes, task changes, etc. However, the OS 120 stops both the cores from performing any other task while the OS 120 runs the monolithic code. Further, once the OS 120 completes the execution of the monolithic code, both the cores will include the updated data related to the task. Further, the OS 120 relinquishes the control of both the cores.

Referring to FIG. 4A, the modular scheduler 140 is executing on the core 0. However, while the modular scheduler 140 is executing on the core 0, the core 1 also wants the scheduler instance. According to the embodiment, the scheduler instance is fragmented and hence the modular scheduler 140 can execute on both the core 0 and the core 1 simultaneously. The core 0 enters the critical section and the modular scheduler 140 runs the first scheduler instance. While the modular scheduler 140 runs the first scheduler instance, the core 1 is also running some task and is not halted. However, an event in the core 1 triggers a requirement for the core 1 to enter the critical section and therefore, the core 1 waits until the core 0 exits the critical section.

When the core 0 releases the critical section, the core 1 enters the critical section. On entering the critical section, the modular scheduler 140 performs the balancing with respect to core 1, executes the scheduling instance required for the core 1 and exits the critical section. Further, while the modular scheduler 140 is executing on the core 1, the core 0 may encounter an event which creates a requirement for the scheduler instance. Hence, the core 0 will have to wait for the core 1 to release the critical section to be able to acquire access to the critical section. However, due to the scheduler instance on the core 1, there may be some changes which are created in the OS 120 and the core 0 needs to balance the changes. Thus, when the core 0 acquires the access to the critical section for the second time, the scheduler instance of the modular scheduler 140 executing on the core 0 ensures the OS 120 acts on the latest changes. Therefore, in the embodiment, the parallelism of the scheduler instances provides dynamism to the system.

Figure 4B:
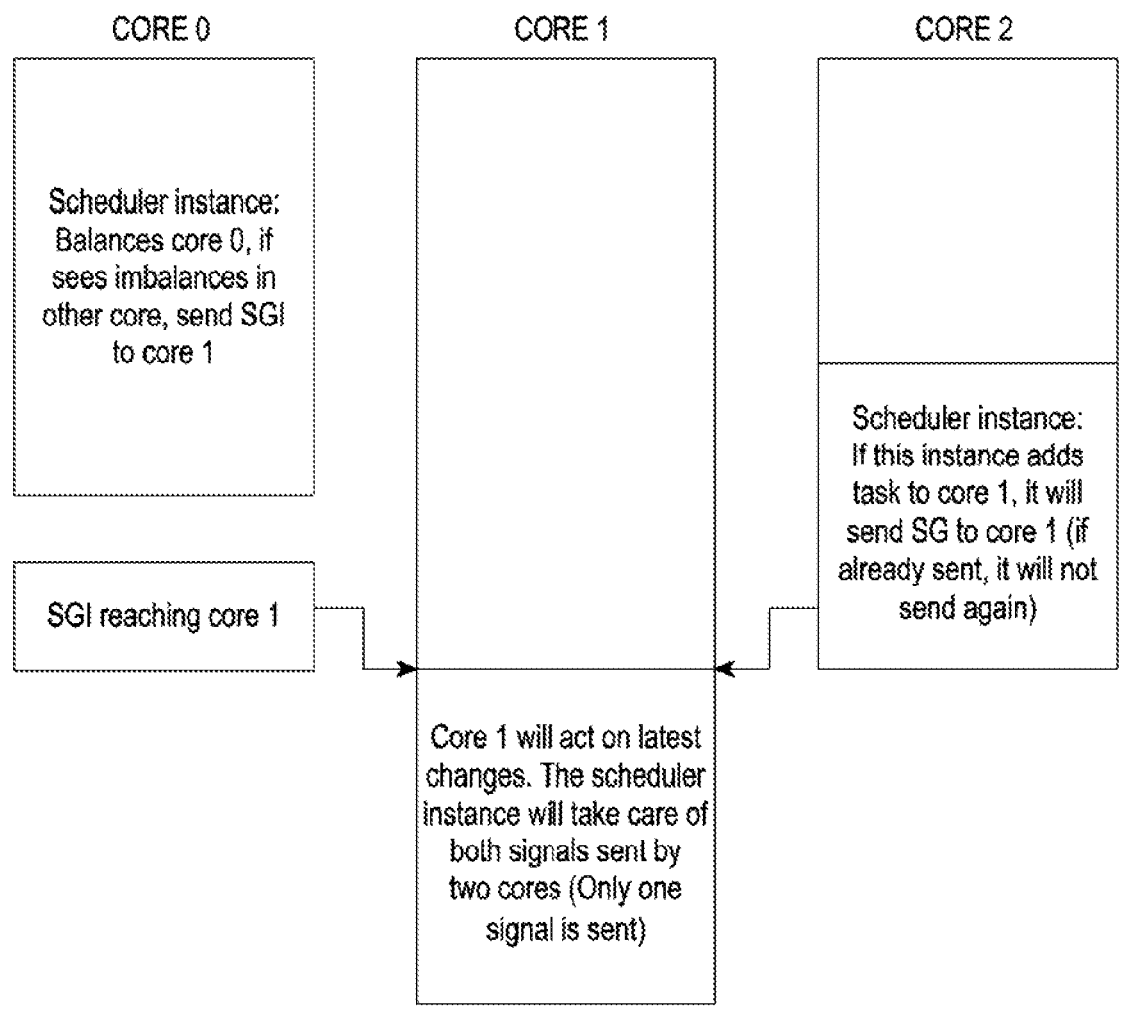
FIG. 4B is an example illustrating time parallel execution of the scheduling instance on three cores of the multi-core system according to an embodiment as disclosed herein.

FIG. 4B is an example illustrating time parallel execution of the scheduling instance on three cores of the multi-core system according to an embodiment as disclosed herein.

Referring to FIG. 4B in conjunction with FIG. 4A, the time parallel execution of the scheduling instance on the three cores, i.e., the core 0, the core 1 and the core 2 is provided. The modular scheduler 140 running on the core 0 balances the core 0 of any imbalance and sends the signal (SGI) to the core 1. The OS 120 execution on the core 0 is independent of the SGI invoked to perform the execution on the core 1.

On receiving the SGI, the core 1 runs the modular scheduler 140 for balancing of the core 1. Further, by the time the SGI sent by the core 0 reaches the core 1, the core 2 may take the critical section and perform the required state changes, i.e., the addition of new task to the core 1 queue. Therefore, the core 1 executes on the latest modification which has occurred in the OS 120. Also, unlike the conventional methods and systems, the method according to the embodiment sends only a single SGI, thereby reducing the redundant signaling and latency in the OS 120.

Therefore, in the embodiment, the execution is performed serially, where a first state is completed on the core 0 and invokes a second state which is to be completed on the core 1, along with a third state related to the core 2. In the conventional methods and systems, the first state, the second state and the third state are all handled in the same instant by taking control of all the three cores on which the state change is bound to occur. Therefore, until the execution of the scheduling instances is completed, all three cores are stopped from performing any other action, thereby impacting the real time determinism and the processing time of the apparatus 100.

Figure 5A:
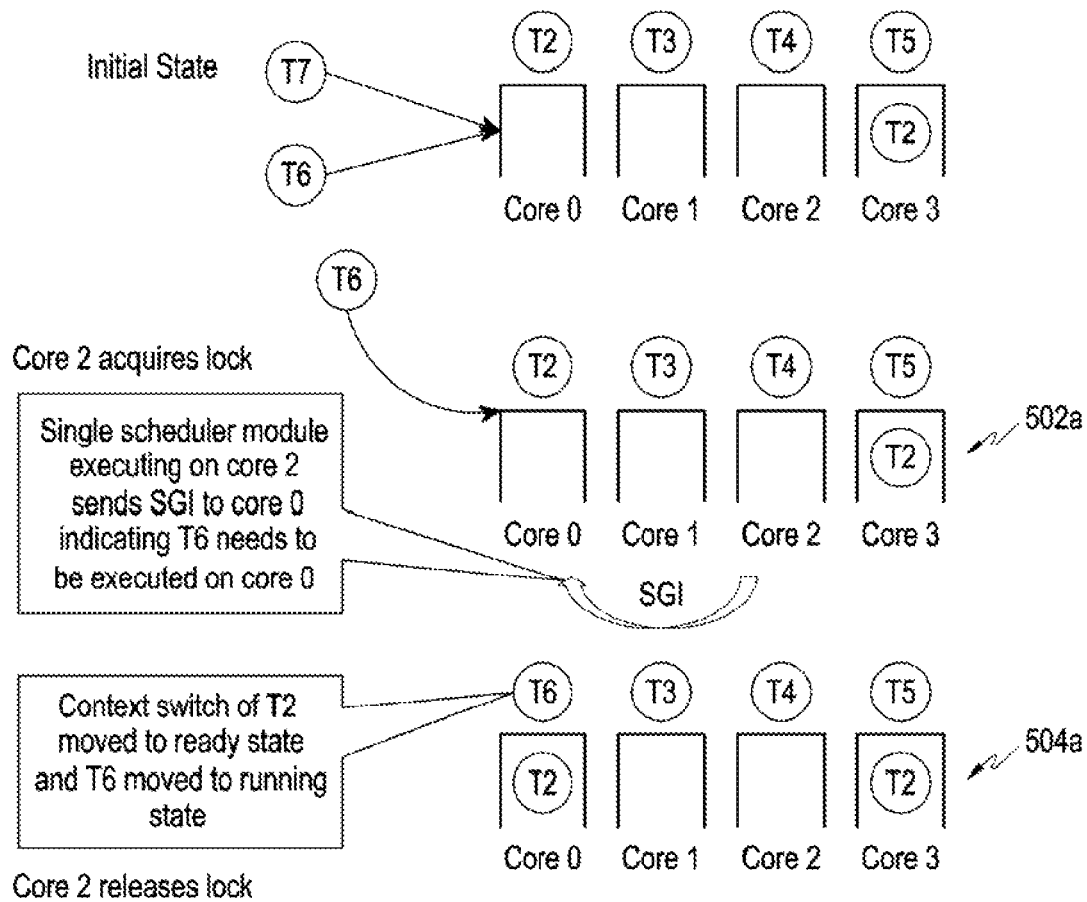
FIG. 5A and FIG. 5B are an example illustrating the scheduling of tasks and performing a task migration based on a single scheduler module according to related art.
Figure 5B:
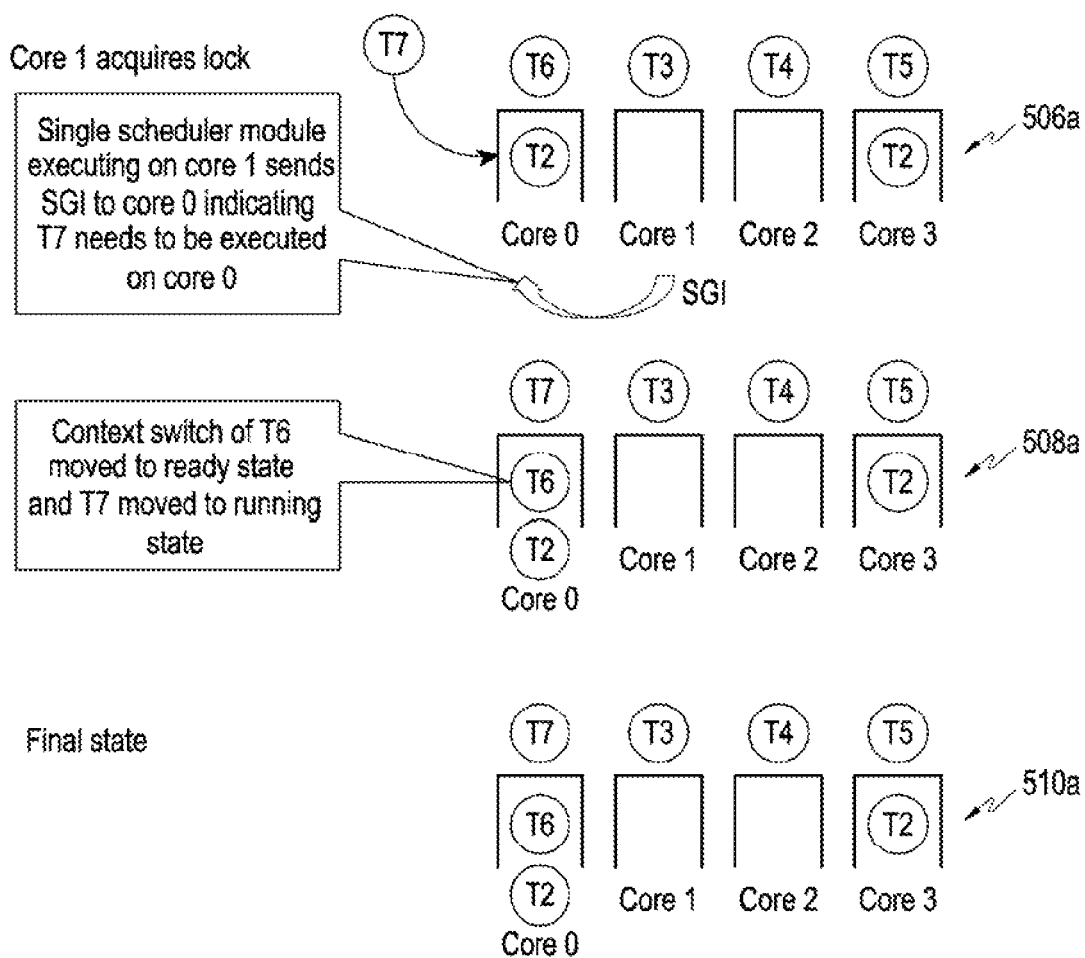

FIG. 5A and FIG. 5B are an example illustrating the scheduling of tasks and performing task migration based on the single scheduler module, according to related art.

For instance, a multi-core system may include four cores, i.e., the core 0, the core 1, the core 2 and the core 3 with four tasks running on the four cores, i.e., task T2 running on the core 0, task T3 running on the core 1, task T4 running on the core 2 and task T5 running on the core 3 in the initiate state. Also the task T2 has a priority of 2, the task T3 has a priority of 3, the task T4 has a priority of 4 and the task T5 has a priority of 5. Further, the task T5 has the highest priority among the tasks executing in the multi-core system. Initially, the task T2 is running on the core 0. Due to some event on the core 2, a task T6 is added to the core 0 and due to some event on the core 1, a task T7 is added to the core 0 at a same instance of time.

Referring to FIG. 5A and FIG. 5B, in the conventional methods and systems, at step 502a, when the task T6 needs to be added by the core 2 to the core 0, a single scheduler module runs on the core 2. The single scheduler module is responsible for scheduling the tasks on all the cores and hence when invoked, the single scheduler module acquires the lock, and determines the priority of the tasks executing on all the cores and the balancing of all the cores, i.e., the core 0, the core 1, the core 2 and the core 3. When the single scheduler module is invoked on the core 2, the single scheduler module determines the balances of all the cores. Therefore, the single scheduler module takes a longer scheduler instance. Further, if the single scheduler module is invoked by the plurality of cores and at every scheduler instance if the single scheduler module is going to check the balance of all the cores, then it will take a long time during which the locks will be held. When locks are held by a specific core, then the other cores cannot perform the kernel functionality. Also, at any instant of time, any event may occur on any of the four cores.

Further, at step 502a, the single scheduler module executing on the core 2 sends the SGI to the core 0 to indicate that some event has occurred on the core 2 and as a result of the event, the task 6 needs to be executed on the core 0. At step 504a, the single scheduler module executes and determines the balancing of all the cores based on the priority of the tasks which are in various states in the queues of all the cores. The balancing of all the cores based on the priority of the tasks includes rescheduling the higher priority tasks by performing the context switch of task T6 into running state, i.e., the task T6 is moved into the running state on the core 0 and the task T2 which has the least priority among all the tasks running on the plurality of cores is moved into the ready to run state by the single scheduler module on the core 0.

At step 506a, the single scheduler module executing on the core 1 sends the SGI to the core 0 to indicate that some event has occurred on the core 1 as a result of which the task 7 needs to be executed on the core 0. At step 508a, the single scheduler module executes and determines the balancing of all the cores based on the priority of the tasks which are in various states in the queues of all the cores, i.e., the task T7 is moved into the running state on the core 0 and the task T6 which has the lower priority than the task T7 is moved into the ready to run state by the single scheduler module. In the conventional method, the single scheduler module executes completely twice, i.e., while adding the task T6 to the core 0 and while adding the task T7 to the core 0. Further, the task T6 was redundantly scheduled on the core 0 in the running state for a short duration of time, even though the single scheduler module was aware that the task T7 having higher priority than the task T6 needs to be executed on the core 0 due to the event on the core 1.

Figure 5C:
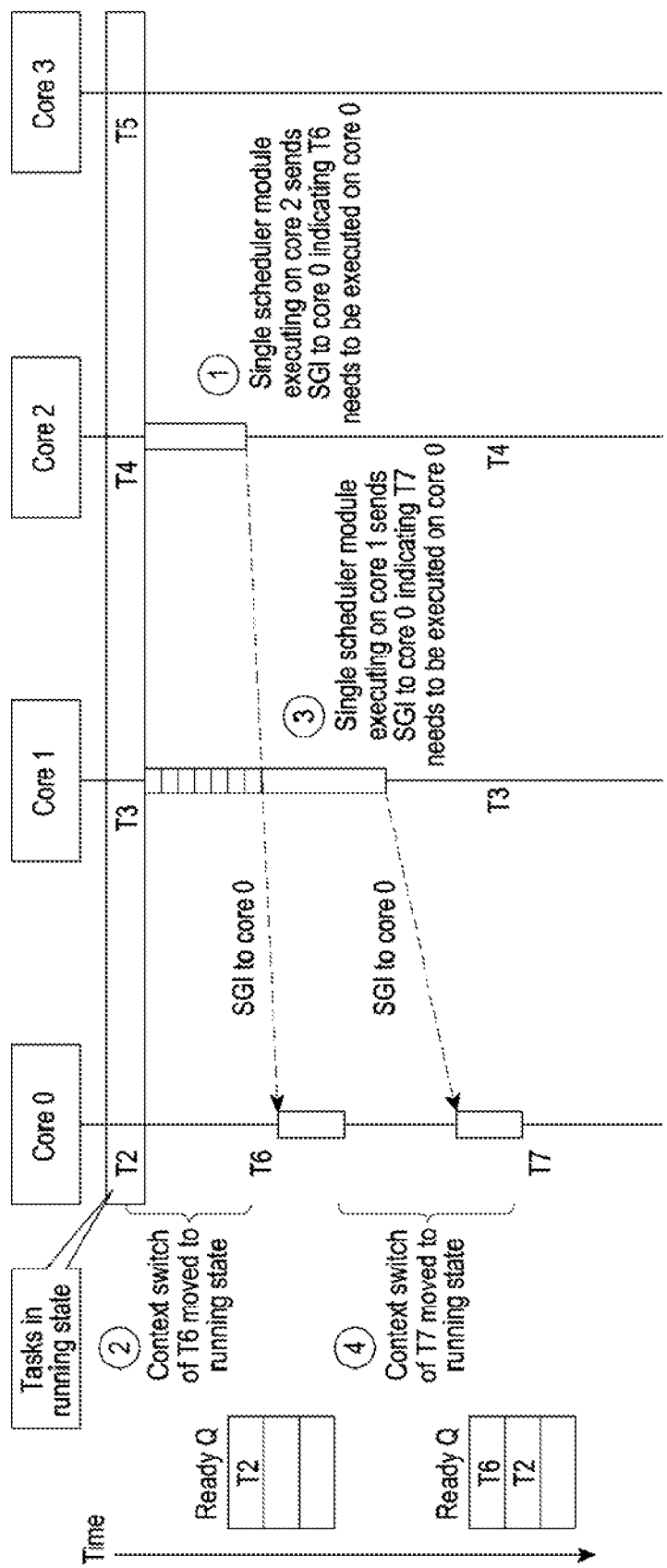
FIG. 5C is an example scheduling diagram illustrating the scheduling of tasks and performing the task migration based on the single scheduler module according to related art.

FIG. 5C is an example scheduling diagram illustrating the scheduling of tasks and performing the task migration based on the single scheduler module according to related art.

Referring to FIG. 5C, in conjunction with FIG. 5A and FIG. 5B, at step 1, the single scheduler module executing on the core 2 signals the core 0 by sending the SGI to the core 0 to indicate that the task 6 needs to be executed on the core 0. Further, the core 0 receives the SGI from the core 2 and, in response to the SGI, at step 2, executes the single scheduler module completely to determine the balancing of all the cores. Further, the single scheduler module performs the context switch of the task T6 to balance the cores by rescheduling the task T6 into the running state on the core 0 and the task T2 which has the least priority among all the tasks running on the plurality of cores is moved into the ready to run state on the core 0.

At step 3, the core 1 tries to get access of the single scheduler module on the core 0 to execute the task T7 on the core 0. However, since the single scheduler module includes using a single lock to access the critical section of the core 0 and the lock is already held by the core 2 which is executing the task T6 on the core 0, the core 1 will not be able to get access to the core 0. However, once the core 2 releases the lock, the core 1 acquires the lock to execute on the core 0 and the single scheduler module executing on the core 1 sends the SGI to the core 0 to indicate that the task T7 needs to be executed on the core 0. At step 4, the core 0 receives the SGI from the core 1 and, in response to the SGI, executes the single scheduler module completely to determine the balancing of all the cores. Further, the single scheduler module performs the context switch of the task T7 to balance the cores by rescheduling the task T7 into the running state on the core 0 and the task T6 which has the lower priority than the task T7 is moved into the ready to run state on the core 0.

Figure 5D:
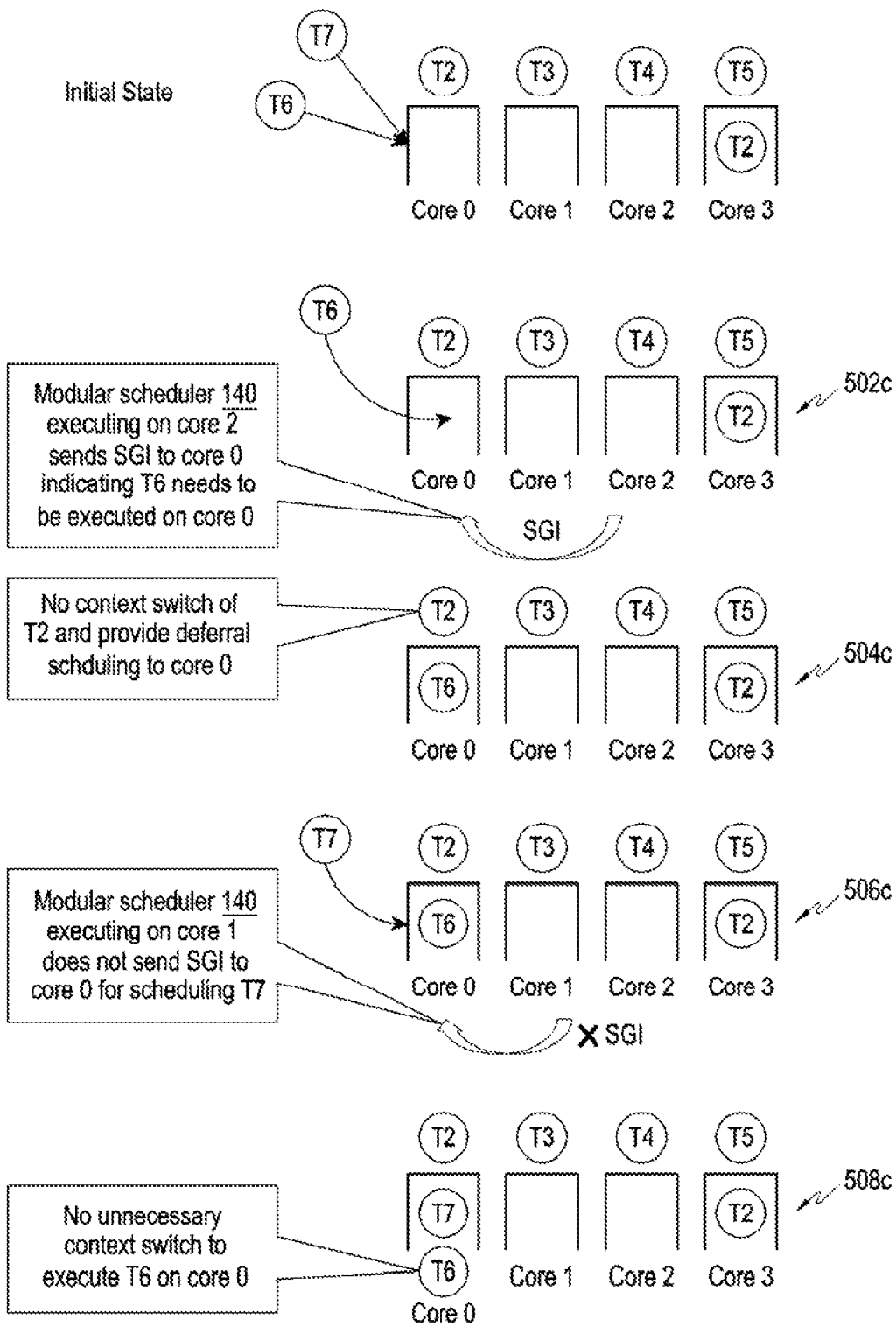
FIG. 5D and FIG. 5E are an example illustrating the scheduling of tasks and performing the task migration based on a modular scheduling instances according to an embodiment as disclosed herein.
Figure 5E:
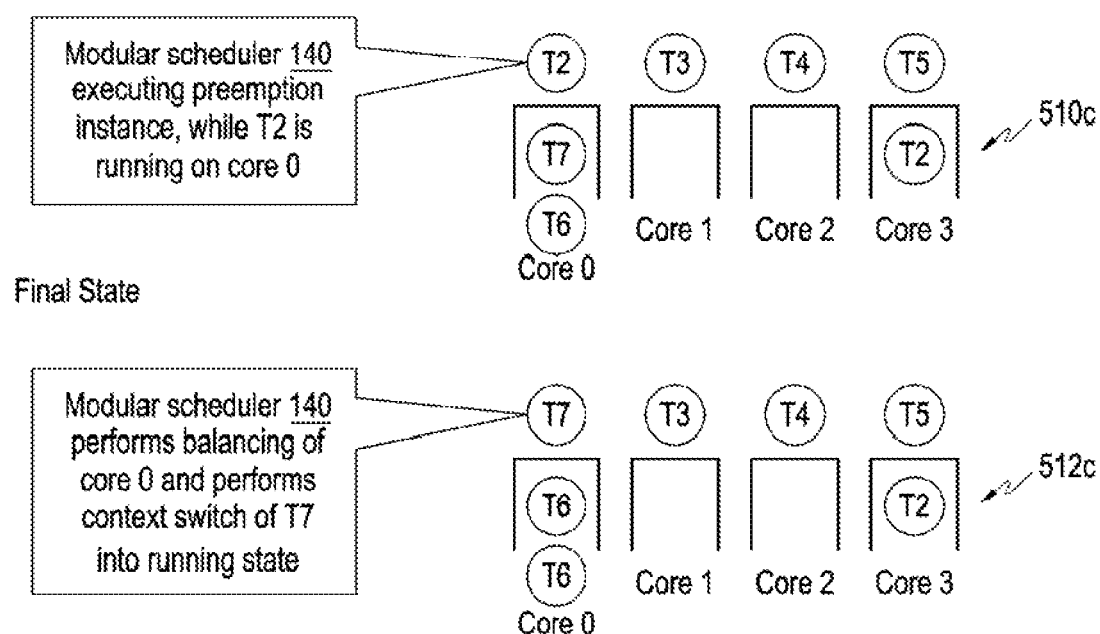

FIG. 5D and FIG. 5E are an example illustrating the scheduling of tasks and performing task migration based on the modular scheduling instances according to an embodiment as disclosed herein.

Referring to FIG. 5D and FIG. 5E, in conjunction with the FIG. 5A and FIG. 5B, at step 502*c*, the preemption instance of the modular scheduler 140 is executing on the core 2. The preemption instance of the modular scheduler 140 determines that the incoming task T6 (to core 0) has a higher priority when compared to the running task T2 on the core 0. Further, the modular scheduler 140 decides to defer the context switch operation to be performed on the core 0 and carries out the required state changes and sends the SGI to the core 0 to indicate that some event has occurred on the core 2 and, as a result of the event, the task 6 needs to be added on to the core 0. Further, the modular scheduler 140 executing on the core 2 will not initiate the scheduling on the core 2 itself. The modular scheduler 140 executing on the core 2 will only provide the deferral scheduling to the core 0, i.e., inform the core 0 to start the scheduling. At step 504*c*, the modular scheduler 140 executes only the preemption instance on the core 0 and defers the context switch of the task 6 on the core 0 by adding the task 6 to the ready-to-run state. Therefore, the modular scheduler 140 does not perform the context switch to address the imbalance in the multi-core system due to the addition of the task T6 due to dynamic adaptation as the task 7 may nullify the effect (e.g., modification of the state) of the current event associated with the task 6.

At step 506*c*, the preemption instance of the modular scheduler 140 executes on the core 1 and activates the task T7 to be scheduled on the core 0 before the actual context switch at the core 0 (i.e., the task T2 being replaced by the task T6). Unlike the conventional methods and schedulers, the modular scheduler 140 executing on the core 1 does not send the SGI to the core 0 and directly adds the task 7 to be executed on the core 0.

At step 508*c*, the modular scheduler 140 executes only the preemption instance and there is no need to send the SGI again to the core 0 for performing the scheduling. Further, when the modular scheduler 140 is executing the preemption instance, the task T2 is running on the core 0 (as shown in step 510*c*). At step 512*c*, the modular scheduler 140 determines the balancing of the core 0 based on the priority of the tasks which are in various states in the queues of the core 0, i.e., the task T7 is moved into the running state on the core 0 and the task T2 which has the lower priority than the task T7 is moved into the ready to run state by the modular scheduler 140. In the embodiment, the modular scheduler 140 does not check balancing on all other cores and rather, the modular scheduler 140 only signals the core 0 that the new task is bounded to the core 0 and hence needs to check. Therefore, the modular scheduler 140 on the core 2 has taken less time.

In the conventional methods and systems, the core 2 takes the lock, runs the single scheduler module, performs the context switch on the core 0, i.e., one task which is already running on the core 0 is moved to another state and the task of higher priority is shifted into the running state. The context switch has its own overhead and redundant context switches increases the redundancy in the system. Further, the conventional methods and systems include a feedback mechanism associated with the SGI. Unlike the conventional methods and systems, in the embodiment, the SGI is only a one way signal to indicate to a target core that the scheduling has been deferred and hence, the target core needs to take care of the scheduling.

Figure 5F:
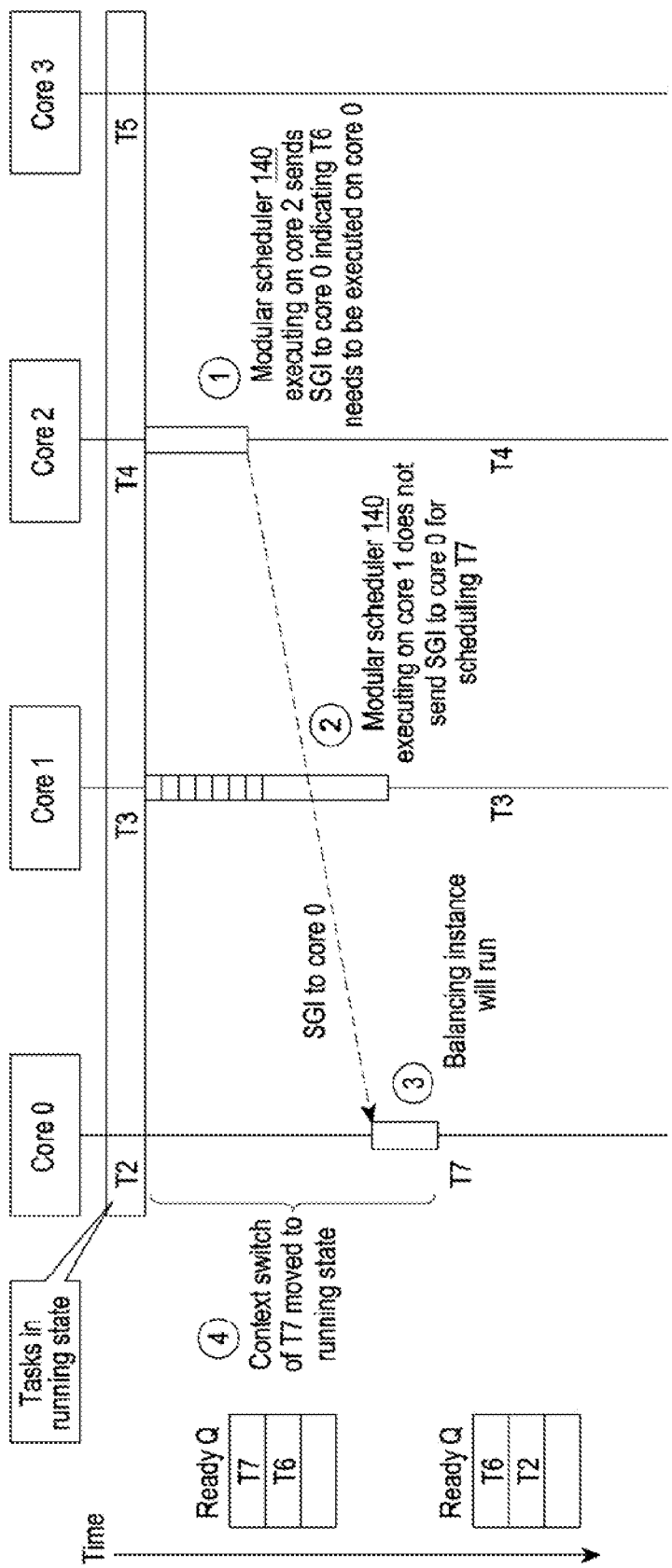
FIG. 5F is an example scheduling diagram illustrating the scheduling of tasks and performing the task migration based on the modular scheduler according to an embodiment as disclosed herein.

FIG. 5F is an example scheduling diagram illustrating the scheduling of tasks and performing the task migration based on the modular scheduler 140 according to an embodiment as disclosed herein.

Referring to FIG. 5F, in conjunction with the FIG. 5D and FIG. 5E, at step 1, the core 2 executes only the preemption instance of the modular scheduler 140 and signals the core 0 by sending the SGI to the core 0 to indicate that the task 6 needs to be executed on the core 0. Further, the core 0 receives the SGI from the core 2 and, in response to the SGI, executes the modular scheduler 140 to determine the balancing of the core 0 only.

At step 2, once the core 2 releases the lock, the core 1 acquires the lock to execute on the core 0 and the modular scheduler 140 executing on the core 1 does not send the SGI to the core 0. Further, at step 3, the core 0 executes only the balancing instance of the modular scheduler 140 and determines the balancing of the core 0. Further, at step 4, the modular scheduler 140 performs the context switch of the task T7 only to balance the core 0 by rescheduling the task T7 into the running state on the core 0 and the task T2 which has the lower priority than the task T7 is moved into the ready to run state on the core 0.

Figure 5G:
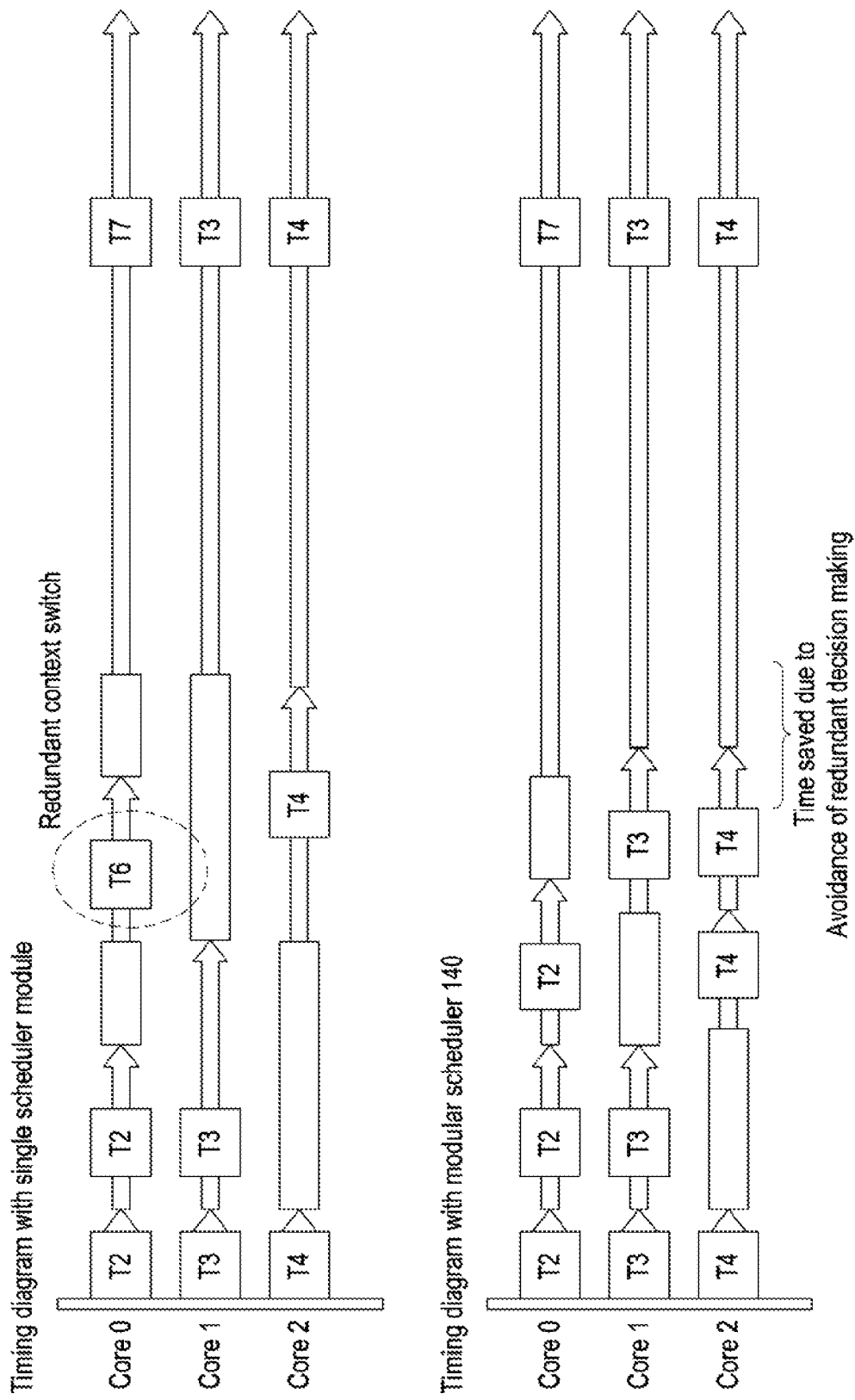
FIG. 5G is an example illustrating a timing diagram illustrating a comparison between the scheduling performed using the conventional single scheduler module and the modular scheduler according to an embodiment as disclosed herein.

FIG. 5G is an example illustrating a timing diagram illustrating a comparison between the scheduling performed using the conventional single scheduler module and the modular scheduler 140 according to an embodiment as disclosed herein.

Referring to FIG. 5G, in conjunction with FIG. 5A and FIG. 5B, the timing diagram for the conventional methods and systems indicate the redundant context switching when the task T6 was added to the core 0 and again another context switching when the task T7 was added to the core 0.

Unlike the conventional methods and systems, in the embodiment, in conjunction with FIG. 5C, there is only one context switch when the task T7 is added to the core 0. Therefore, the time is saved due to the avoidance of redundant decision making.

Figure 6A:
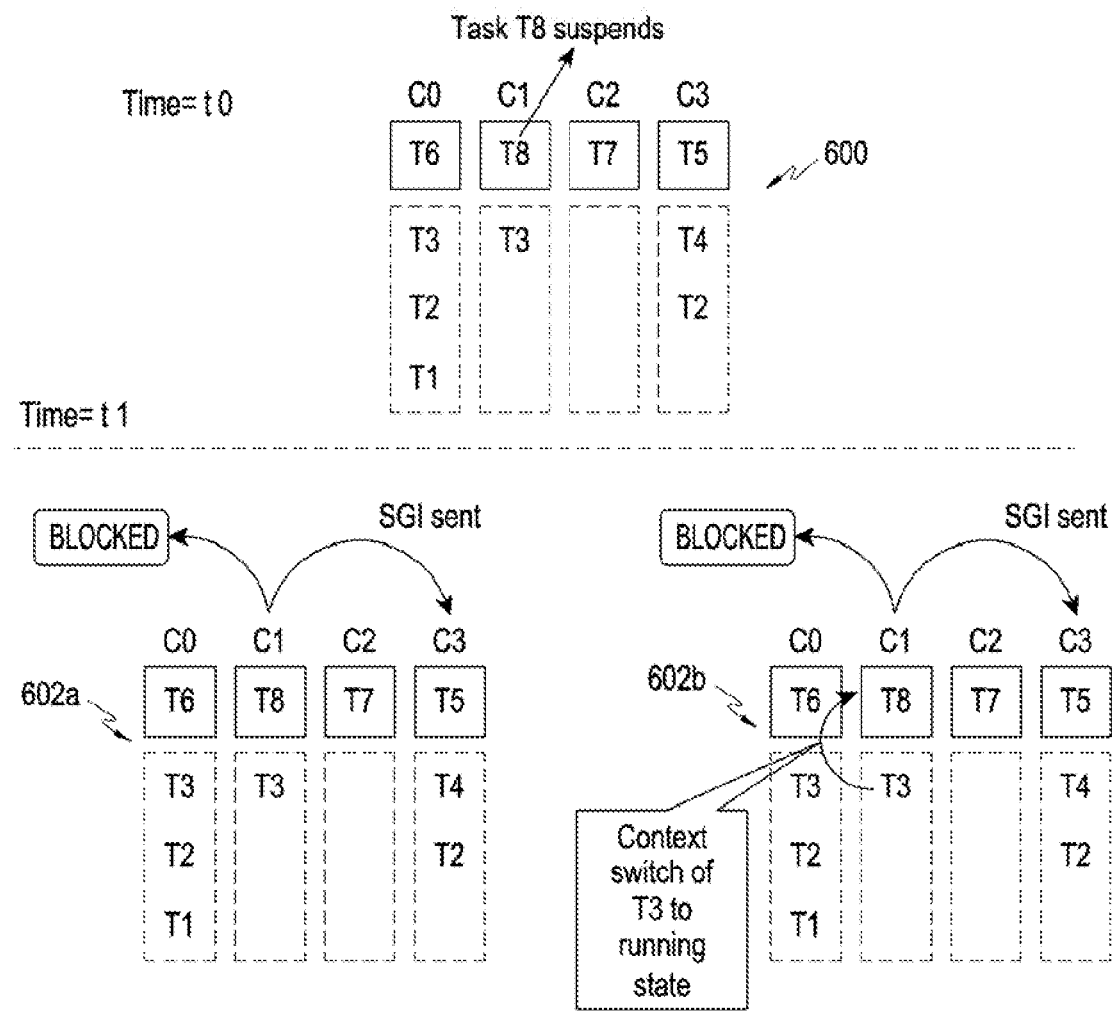
FIG. 6A and FIG. 6B are an example illustrating a comparison between the task migration mechanism performed using a conventional scheduler and the modular scheduler according to an embodiment as disclosed herein.
Figure 6B:
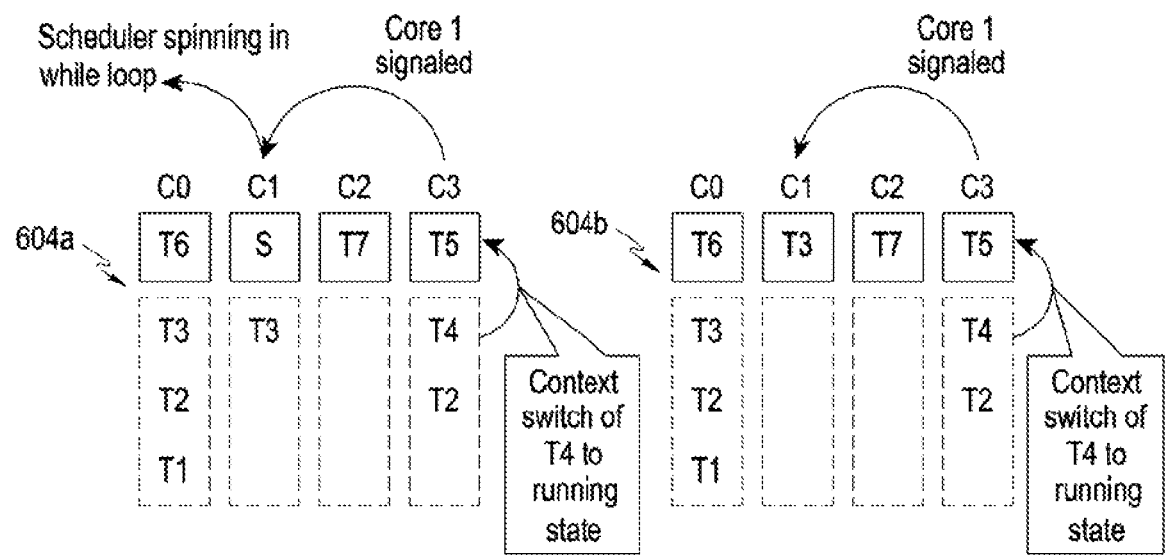
Figure 6B:
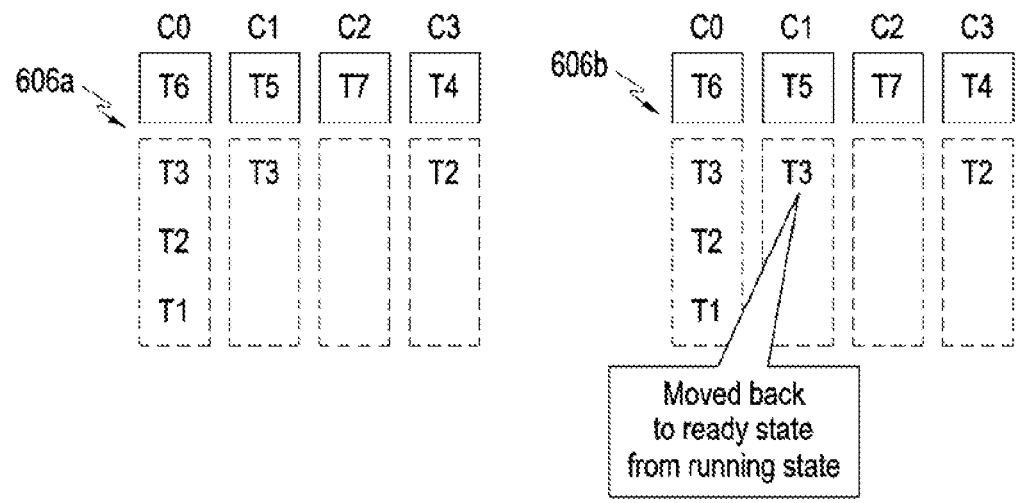

FIG. 6A and FIG. 6B are an example illustrating a comparison between the task migration mechanism performed using the conventional scheduler and the modular scheduler according to an embodiment as disclosed herein.

For instance, a multi-core system may include four cores, i.e., the core 0, the core 1, the core 2 and the core 3 with four tasks running on the four cores, i.e., task T6 running on the core 0, task T8 running on the core 1, task T7 running on the core 2 and task T5 running on the core 3. The task T6, the task T8 and the task T7 are all core bound tasks. However, the task T5 is a free running task and hence is free to execute on any of the plurality of cores. Due to some event on the core 1, the task T8 suspends itself.

In the conventional methods and systems, at step 602*a*, the conventional scheduler is invoked on the core 1. The conventional scheduler sends the SGI to the core 3 for migration of the task T5 into the core 1 as the task T8 having the priority of 8 is moved to blocked state. Further, the core 1 spins in a while loop waiting for the migration of the free to run task T5 from the core 3. At step 604*a*, the core 3 receives the SGI and initiates the migration of the free-to-run task T5 with priority 5 to the core 1. Further, on the core 3, the task having priority 4 is moved into the running state to execute on the core 3. In the meantime, the core 1 continues to spin in the while loop. At step 606*a*, the conventional scheduler restores the context of the free-to-run task T5 on the core 1.

Unlike the conventional methods and systems, in the embodiment, at step 602*b*, the suspension instance of the modular scheduler 140 is invoked on the core 1 when the running task T8 transits the state into the blocked state. The suspension instance of the modular scheduler 140 saves the context of the task transiting out of the running state, i.e., the task T8. Further, the suspension instance of the modular scheduler 140 determines the next highest priority task to be scheduled on the core 1, i.e. the free to run task on the core 3, the task 5 is determined to be migrated from the core 3 and scheduled on the core 1. Furthermore, the suspension instance of the modular scheduler 140 determines that the operation needs to be deferred and signals the core 3 after carrying out the required state modifications and schedules the highest priority task T3 on the core which is currently executing the suspension instance.

However, the modular scheduler 140 does not wait in the while loop and performs the context switch of the task T3 with priority 3, which is present on the ready-to-run queue on the core 1 to execute on the core 1. At step 604*b*, the core 3 receives the SGI from the modular scheduler 140 running on the core 1. On reception of the SGI on the core 3, the balancing instance is invoked on the core 3 which determines that the multi-core system is not balanced and the current running task T5 needs to be migrated onto the core 1 and saves the context of the task T5, schedules the task T4 and intimates the core 1 to carry out further deferred operation of scheduling the task T5. Further, the free-to-run task T5 with the priority 5 is migrated to the core 1 and performs the context switch of the task T4 having the priority 4 to execute on the core 3. However, while the modular scheduler 140 executes on the core 3, the task T3 continues to execute on the core 1, the balancing instance determines that the task T5 needs to be scheduled and further concludes that no further propagation of the scheduling operations is required. At the step 606*b*, the modular scheduler 140 performs the context switch on the core 1 and the task T3 is moved back into the ready state on the core 1. Therefore, the method according to the embodiment provides an overall improvement in CPU utilization.

Figure 7A:
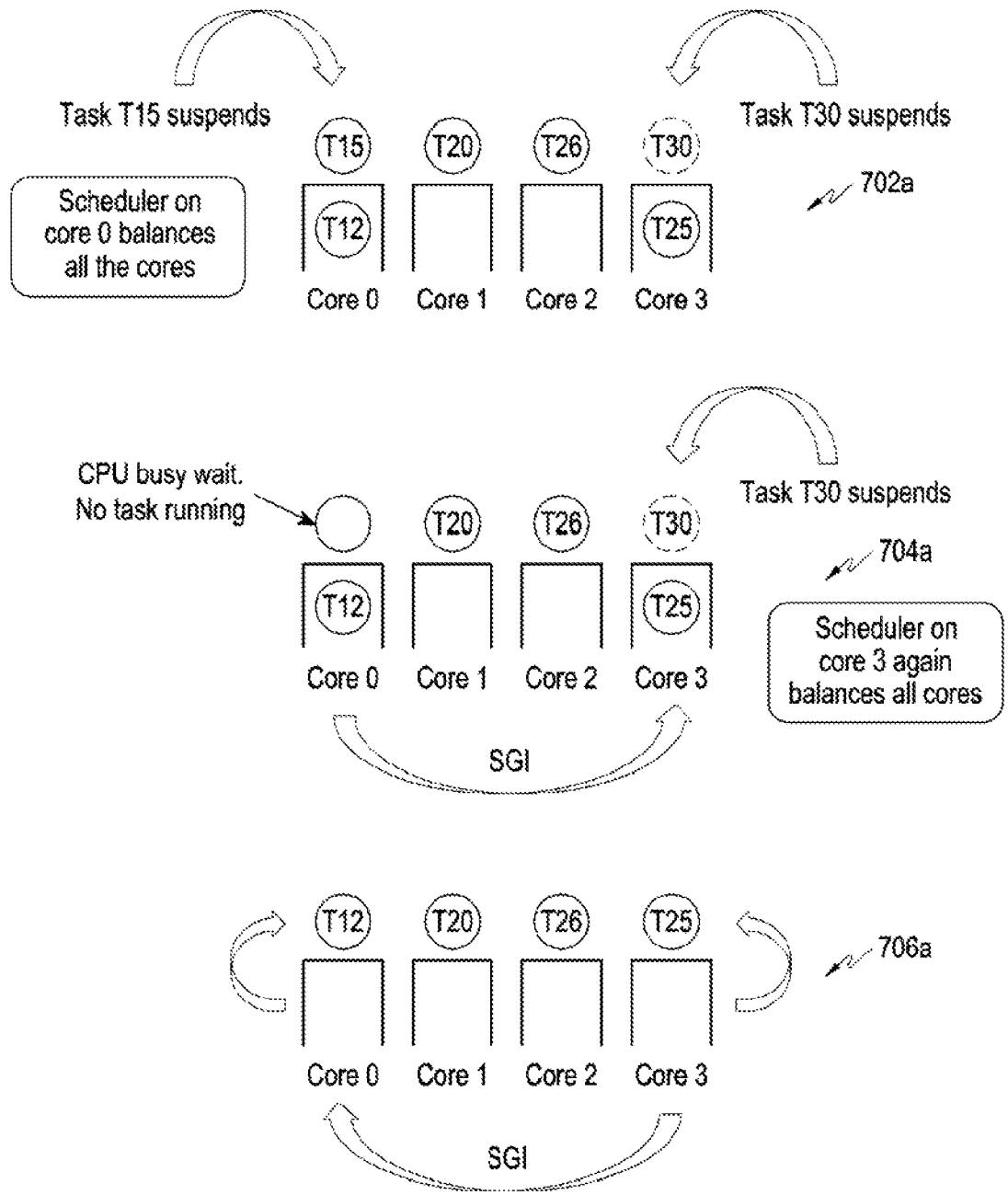
FIG. 7A is an example illustrating signaling between a plurality of cores of the multi-core processor according to related art.

FIG. 7A is an example illustrating the signaling between the plurality of cores of the multi-core processor according to related art.

For instance, a multi-core system may include four cores, i.e., the core 0, the core 1, the core 2 and the core 3 with four tasks running on the four cores i.e., task T15 running on the core 0, task T20 running on the core 1, task T26 running on the core 2 and task T30 running on the core 3. The task T15, the task T20 and the task T26 are all core bound tasks. However, the task T30 is a free running task and hence is free to execute on any of the plurality of cores. Due to some event on the core 0, the task T15 suspends itself and due to some event on the core 3, the task T30 suspends itself.

In the conventional methods and systems, at step 702*a*, the conventional scheduler is invoked on the core 1. The conventional scheduler runs on the core 0, determines whether there exists any imbalance in the multi-core system and balances all the cores of the multi-core system. At step 704*a*, the core 0 sends the SGI to the core 3 to run the monolithic conventional scheduler. The task T12 on the core 0 is still in the ready-to-run state and waiting to be switched into the running state on the core 0. Further, since the task T15 has suspended itself, there is no task running on the core 0, and the core 0 has a busy wait instance.

The conventional scheduler is also invoked on the core 3 as the task T30 also suspends itself. Further, the conventional scheduler again runs on the core 3, determines whether there exists any imbalance in the multi-core system and balances all the cores of the multi-core system.

At step 706*a*, the conventional scheduler initiates the context switch of the task T25 to the running state from the ready-to-run state on the core 3 and sends the SGI to the core 0 to indicate the core 0 to perform the context switch. The core 0 again invokes the conventional scheduler and performs the context switch of the task T12 from the ready-to-run state to the running state on the core 0.

Figure 7B:
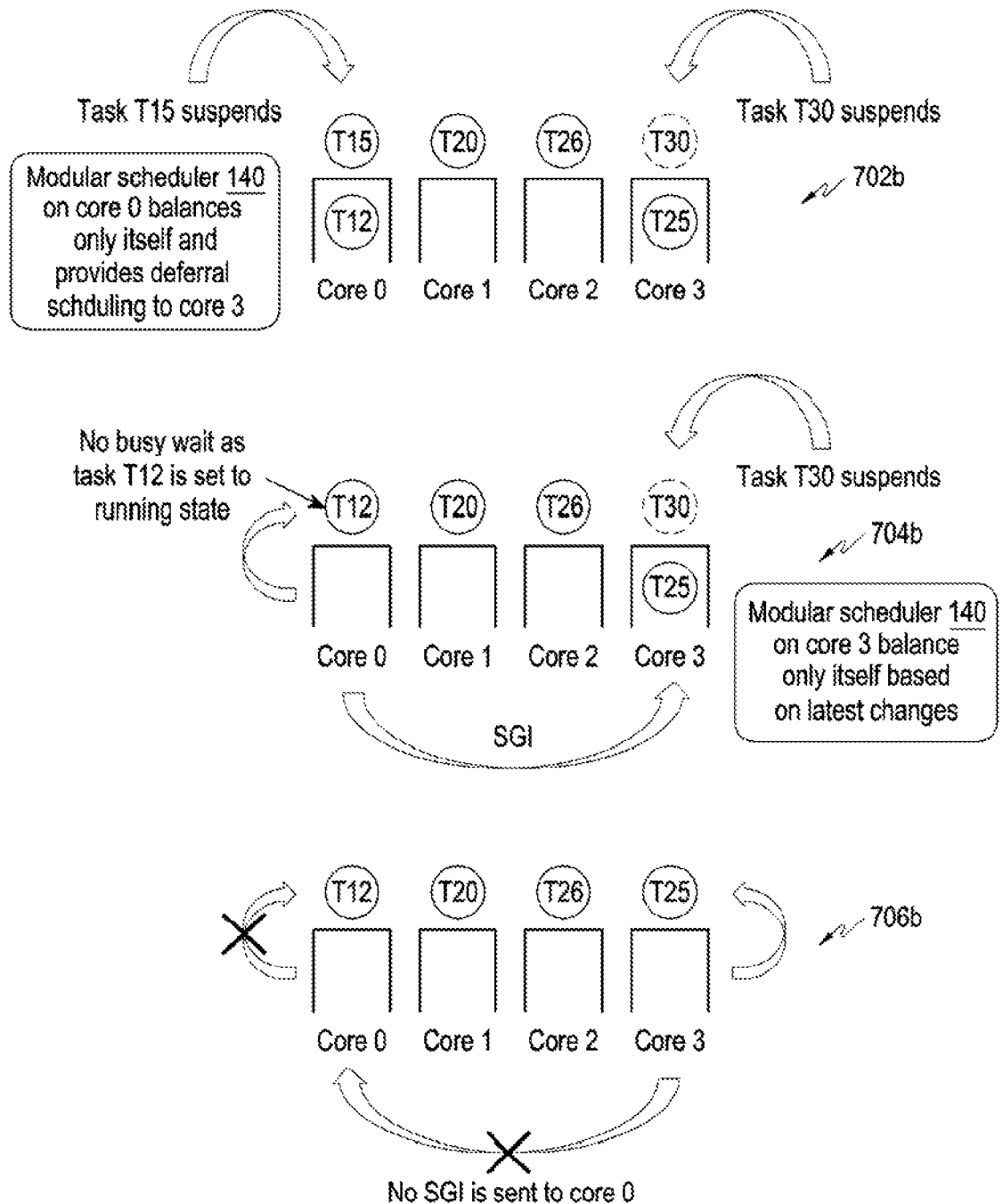
FIG. 7B is an example illustrating modular scheduler instances running on the core of the multi-core processor which addresses a problem of redundant signaling between the plurality of cores of the multi-core processor according to an embodiment as disclosed herein.

FIG. 7B is an example illustrating the modular scheduler instances running on the core of the multi-core processor which addresses the problem of redundant signaling between the plurality of cores of the multi-core processor according to an embodiment as disclosed herein.

Referring to FIG. 7B, in conjunction with FIG. 7A, at step 702*b*, the modular scheduler 140 is invoked on the core 1. The modular scheduler 140 runs on the core 0, determines whether there exists any imbalance in the core 0 and balances only the core 0. The modular scheduler 140 provides the deferral scheduling to the core 3 and does not check whether the other cores of the multi-core system are imbalanced.

At step 704*b*, the modular scheduler 140 performs the context switching of the task T12 from the ready-to-run state to the running state on the core 0. Further, the core 0 also sends the SGI to the core 3 to run the modular scheduler 140. Unlike the conventional methods and systems, in the embodiment, the core 0 does not enter the busy wait state which reduces the efficiency of the multi-core system.

Furthermore, at the step 704*b*, the modular scheduler 140 executes on the core 3, determines whether there exists any imbalance in the core 3 and balances only the core 3 based on the latest changes such as the changes made to the critical section by the task T12 which was moved into the running state on the core 0.

At step 706*b*, the modular scheduler 140 initiates the context switch of the task T25 to the running state from the ready-to-run state on the core 3. However, the modular scheduler 140 does not send the SGI to the core 0. Therefore, the method according to the embodiment reduces the redundant signaling and enhances the responsiveness of the system, The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for scheduling of tasks for an operating system on a multi-core processor, the method comprising:
   receiving a system call for initiating a scheduling operation on a second core;
   invoking a scheduling instance to the second core, wherein the scheduling instance notifies the scheduling operation of an incoming high priority task;
   deferring a switching context instance at the second core, wherein the deferring the switching context instance at the second core comprises unblocking a first core to perform other tasks.

2. The method of claim 1, further comprising:
   executing at least one other system call on at least one core; and
   executing the deferred switching context instance by determining an imbalance in at least one core when a software generated interrupt (SGI) is received by the second core.

3. The method of claim 1, wherein the scheduling instance is invoked by sending a software generated interrupt (SGI),
   wherein the scheduling operation comprises executing the incoming high priority task on the second core, and
   wherein the scheduling instance comprises at least one of:
   preempting a currently running task, wherein the currently running task is running on the second core;
   suspending the currently running task; and
   balancing the currently running task.

4. The method of claim 3, wherein the preempting the task comprises:
   determining a preemption condition by tracking priorities of the task currently running on the second core and a plurality of tasks which are in a ready state;
   determining whether the preemption of the task currently running on the second core needs to be carried out successively in the scheduling instance or to be deferred; and
   performing one of:
   saving a context of a task to be preempted and restoring a context of a task to be executed when the preemption needs to be carried out successively in the scheduling instance, wherein the task to be preempted is the task currently running on the second core and the task to be executed is a task having a higher priority than the task currently running on the second core, and
   performing a system state handling and signaling when the preemption is to be deferred.

5. The method of claim 3, wherein the suspending the currently running task comprises:
   determining that the task currently running is to be suspended;
   saving a context of the task currently running and suspending the task currently running;
   determining a next highest priority task to be scheduled into a running state; and
   performing one of:
   scheduling the next highest priority task successively in a suspension instance, and
   deferring the next highest priority task to a later point, and
   wherein states of the system are modified by the suspension instance.

6. The method of claim 3, wherein the balancing the currently running task comprises:
   determining a deferred operation to be resumed in the invoked instance; and
   performing the deferred operation in the invoked instance.

7. The method of claim 1, wherein signaling between the first core and the second core for notifying events is carried out by activating interrupts invoked by software, and
   wherein the method further comprises receiving a software generated interrupt (SGI) and determining the incoming task to be a high priority task during a first sub-critical section.

8. The method of claim 5, further comprising storing a context of the current running task on the second core and restoring the context of the determined high priority task during a second sub-critical section.

9. The method of claim 1, wherein each of tasks has an associated priority and
   wherein each of the tasks assumes one state from among: ready, running and suspended states.

10. The method of claim 1, wherein the scheduling of the tasks is based on priority, and
    wherein the scheduling instance comprises preemption instance responsible for running a number of tasks equal to the number of cores participating in symmetric multi-processing (SMP), the tasks being chosen from among the tasks having Ready state based on highest priority.

11. An apparatus for scheduling of tasks for an operating system on a multi-core system, the apparatus comprising:
    a memory;
    a multi-core processor comprising a plurality of cores; and
    an operating system (OS) to execute on the multi-core processor,
    wherein the OS comprises a modular scheduler,
    wherein the modular scheduler is coupled to the multi-core processor and the memory and is configured to:
    receive a system call for initiating a scheduling operation on a second core;
    invoke a scheduling instance to the second core, wherein the scheduling instance notifies the scheduling operation of an incoming high priority task; and
    defer a switching context instance at the second core, and
    wherein the deferring the switching context instance at the second core comprises unblocking a first core to perform other tasks.

12. The apparatus of claim 11, wherein the modular scheduler is further configured to:
    execute at least one other system call on at least one core; and
    execute the deferred switching context instance by determining an imbalance in at least one core when a software generated interrupt (SGI) is received by the second core.

13. The apparatus of claim 11, wherein the scheduling instance is invoked by sending a software generated interrupt (SGI), and
    wherein the scheduling operation comprises executing an incoming task on the second core.

14. The apparatus of claim 11, wherein the scheduling instance comprises at least one of:
    preempting a currently running task, wherein the currently running task is running on the second core;
    suspending the currently running task; and
    balancing the currently running task.

15. The apparatus of claim 14, wherein the preempting the task comprises:
    determining a preemption condition by tracking a priority of the task currently running on the second core and a plurality of tasks which are in a ready state;

determining whether the preemption of the task currently running on the second core needs to be carried out successively in the scheduling instance or to be deferred; and performing one of:

saving a context of a task to be preempted and restoring a context of a task to be executed when the preemption needs to be carried out successively in the scheduling instance, wherein the task to be preempted is the task currently running on the second core and the task to be executed is a task having a higher priority than the task currently running on the second core, and performing a system state handling and signaling when the preemption is to be deferred.

16. The apparatus of claim 14, wherein the suspending the currently running task comprises:

determining that the task currently running is to be suspended;

saving a context of the task currently running and suspending the task currently running;

determining a next highest priority task to be scheduled into running state; and performing one of:

scheduling the next highest priority task successively in the suspension instance, and deferring the next highest priority task to a later point, and wherein states of the system are modified by the suspension instance.

17. The apparatus of claim 14, wherein the balancing the currently running task comprises:

determining a deferred operation to be resumed in the invoked instance; and performing the deferred operation in the invoked instance.

18. The apparatus of claim 11, wherein signaling between the first core and the second core for notifying events is carried out by activating interrupts invoked by software; and wherein the modular scheduler is configured to receive a software generated interrupt (SGI) and determine the incoming task to be a high priority task during a first sub-critical section.

19. The apparatus of claim 16, wherein the modular scheduler is further configured to store a context of the current running task on the second core and restore a context of the determined high priority task during a second sub-critical section.

20. The apparatus of claim 11, wherein each of tasks has an associated priority;

wherein each of the tasks assumes one state from among: ready, running and suspended states, and wherein the scheduling of tasks is based on priority, and wherein the scheduling instance comprises a preemption instance responsible for running a number of tasks equal to the number of cores participating in symmetric multi-processing (SMP), the tasks being chosen from among the tasks having Ready state based on highest priority.

* * * * *